(12) United States Patent
Prakash et al.

(10) Patent No.: US 8,589,302 B2
(45) Date of Patent: Nov. 19, 2013

(54) AUTOMATED MODULAR AND SECURE BOOT FIRMWARE UPDATE

(75) Inventors: Gyan Prakash, Beaverton, OR (US); Saurabh Dadu, Tigard, OR (US); Selim Aissi, Beaverton, OR (US); Hormuzd M. Khosravi, Portland, OR (US); Duncan Glendinning, Chandler, AZ (US); Cris Rhodes, Tualatin, OR (US)

(73) Assignee: Intel Corporation, Santa Clara, CA (US)

( * ) Notice: Subject to any disclaimer, the term of this patent is extended or adjusted under 35 U.S.C. 154(b) by 888 days.

(21) Appl. No.: 12/592,605

(22) Filed: Nov. 30, 2009

(65) Prior Publication Data

US 2011/0131447 A1    Jun. 2, 2011

(51) Int. Cl.
*G06Q 99/00* (2006.01)

(52) U.S. Cl.
USPC ............... 705/50; 713/2; 714/19; 714/47.1; 726/2

(58) Field of Classification Search
USPC ............... 705/50; 713/2; 714/19, 47.1; 726/2
See application file for complete search history.

(56) References Cited

U.S. PATENT DOCUMENTS

| 5,210,854 | A  | * | 5/1993 | Beaverton et al. | 717/174 |
|-----------|----|---|--------|------------------|---------|
| 6,754,828 | B1 | * | 6/2004 | Marisetty et al. | 726/2   |
| 7,024,551 | B2 | * | 4/2006 | King et al.      | 713/2   |
| 7,356,707 | B2 | * | 4/2008 | Foster et al.    | 713/189 |
| 7,376,870 | B2 | * | 5/2008 | Kataria et al.   | 714/47.1 |
| 2004/0083375 | A1 | * | 4/2004 | Foster et al.  | 713/189 |
| 2004/0133771 | A1 | * | 7/2004 | King et al.    | 713/100 |
| 2005/0044363 | A1 | * | 2/2005 | Zimmer et al.  | 713/170 |
| 2006/0075276 | A1 | * | 4/2006 | Kataria et al. | 714/4   |
| 2009/0100159 | A1 | * | 4/2009 | Extra           | 709/221 |

FOREIGN PATENT DOCUMENTS

| CN | 1506813 A | 6/2004 |
|----|-----------|--------|
| CN | 1647443 A | 7/2005 |

(Continued)

OTHER PUBLICATIONS

Office Action Received for the European Patent Application No. 10251643.2, mailed on Oct. 3, 2011, 4 pages.
Office Action Received for the Japanese Patent Application No. 2010-214374, mailed on Jul. 31, 2012, 5 pages of Office Action, including 2 pages of English translation.

(Continued)

*Primary Examiner* — James D Nigh
(74) *Attorney, Agent, or Firm* — Jordan IP Law, LLC

(57) ABSTRACT

A method, apparatus, system, and computer program product for an automated modular and secure boot firmware update. An updated boot firmware code module is received in a secure partition of a system, the updated boot firmware code module to replace one original boot firmware code module for the system. Only the one original boot firmware code module is automatically replaced with the updated boot firmware code module. The updated boot firmware code module is automatically executed with the plurality of boot firmware code modules for the system and without user intervention when the system is next booted. The updated boot firmware code module may be written to an update partition of a firmware volume, wherein the update partition of the firmware volume is read along with another partition of the firmware volume containing the plurality of boot firmware code modules when the system is booted.

15 Claims, 7 Drawing Sheets

(56) References Cited

FOREIGN PATENT DOCUMENTS

| | | |
|---|---|---|
| CN | 101031890 A | 9/2007 |
| CN | 101414160 A | 4/2009 |
| EP | 1970830 A2 | 9/2008 |
| JP | 10-307726 A | 11/1998 |
| JP | 2002-23877 A | 1/2002 |
| JP | 2005-196747 A | 7/2005 |
| JP | 2009-110297 A | 5/2009 |
| KR | 20070046963 A | 5/2007 |
| WO | 2004/038561 A2 | 5/2004 |
| WO | 2009062965 A2 | 5/2009 |

OTHER PUBLICATIONS

Notice of Allowance received for Korean Patent Application 10-2010-0092955, mailed on Jan. 14, 2013, three pages, including one page of English translation.

Notice of Allowance received for Japanese Patent Application 2010-214374, mailed on Dec. 4, 2012, one page of allowance, three pages of allowed claims in English.

Office Action received for Chinese Patent Application No. 201010572666.6, mailed on Mar. 5, 2013, 15 pages of Office Action including 9 pages of English translation.

* cited by examiner

AUTOMATED MODULAR AND SECURE BOOT FIRMWARE UPDATE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to maintenance of BIOS and boot firmware code in computer systems.

BACKGROUND

Originally developed for IBM PC Compatible computers, the Basic Input/Output System (BIOS), also known as the System BIOS, is a de facto standard defining a firmware interface. The BIOS is boot firmware, designed to be the first code run by a PC when powered on. The initial function of the BIOS is to identify, test, and initialize system devices such as the video display card, hard disk, and floppy disk and other hardware. This is to prepare the machine into a known state, so that software such as an operating system stored on compatible media can be loaded, executed, and given control of the PC. This process is known as booting, or booting up, which is short for bootstrapping.

BIOS programs provide a small library of basic input/output functions that can be called to operate and control the peripherals such as the keyboard, text display functions and so forth. When a system is powered on, BIOS checks system configuration settings and loads programs that act as translators between the hardware components and the operating system into memory. For example, when a user presses a key on the keyboard, the signal is sent to a keyboard interrupt handler, which tells the processor what it is and passes it on to the operating system.

BIOS was developed for the IBM PC at a time when processors functioned in a 16-bit processor mode and addressable memory was limited to one megabyte, and the code reflected IBM PC AT hardware dependencies. Operating systems later developed for 32-bit processors began to include device drivers to handle I/O rather than rely on invoking the 16-bit runtime interface provided by BIOS. These device drivers are often provided by platform firmware and are loaded into memory during BIOS initialization prior to loading the operating system. The Extensible Firmware Interface (EFI) is a specification that defines a software interface between an operating system and platform firmware. EFI defines boot services, which include text and graphical console support on various devices, bus, block, and file services, and runtime services, such as date, time, and NVRAM services. More information about the EFI specification is provided at the URL developer-intel-com/technology/efi/main_specification.htm (where URLs are described herein by omitting the 'http://' prefix and replacing the '.' character with the '-' character to avoid an active hyperlink from within this document).

DETAILED DESCRIPTION

Figure 1:
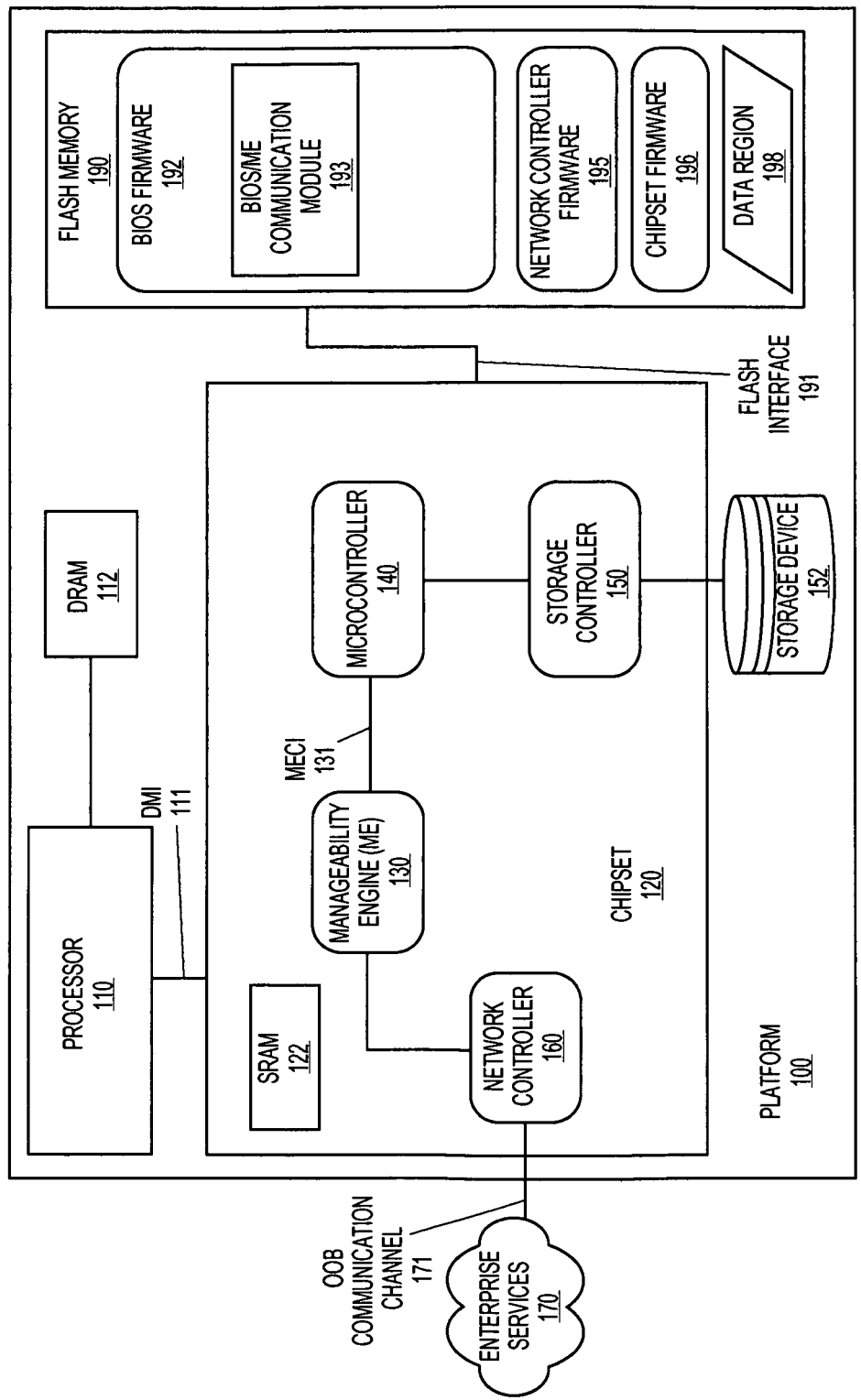
FIG. 1 is a block diagram of a system configured to enable automated modular boot firmware updates in accordance with one embodiment of the invention.

Embodiments of the present invention may provide a method, apparatus, system, and computer program product for performing a modular boot firmware update. BIOS and platform firmware updates have traditionally been performed by providing a monolithic image of the BIOS/boot firmware code modules and requesting a local user to reboot the system in order to install the BIOS/boot firmware updates.

In one embodiment, a method includes receiving an updated boot firmware code module to replace one boot firmware code module of multiple boot firmware code modules for the system and automatically causing the updated boot firmware code module to be loaded instead of the one boot firmware code module when the system is booted. The updated boot firmware code module replaces only the one boot firmware code module and not all of the boot firmware code modules for the system when the system is booted.

Automatically causing the updated boot firmware code module to be loaded may be performed without action by a user of the system. In one embodiment, the method further includes writing the updated boot firmware code module to an update partition of a firmware volume, wherein the update partition of the firmware volume is read along with another partition of the firmware volume containing the boot firmware code modules when the system is booted. The method may include confirming the integrity of the updated boot firmware module prior to writing the updated boot firmware module to the update partition of the firmware volume.

In one embodiment, the updated boot firmware module is offered by a server via an out-of-band communication channel coupled to the microprocessor. The method may further include authenticating the integrity of the server prior to receiving the updated boot firmware module. If a problem occurs during loading of the updated boot firmware module, the method may include causing the one original boot firmware module to be loaded. In one embodiment, the method further includes providing a status of installation of the updated boot firmware module after the system is booted to a server from which the updated boot firmware module was received.

The present invention improves upon the traditional BIOS/platform firmware monolithic image update process and allows for modular and secure updates of BIOS and platform firmware. The present invention enables updates to be performed for a specific BIOS/platform firmware code module/driver or an application. With platform firmware becoming increasingly sophisticated and providing critical functionality such as security features, defects in the BIOS and platform firmware can now be immediately corrected and provided by enterprise management servers rather than requiring an original equipment manufacture to provide a new monolithic image for the entire BIOS/platform firmware region of flash memory for the system.

Reference in the specification to "one embodiment" or "an embodiment" of the present invention means that a particular feature, structure or characteristic described in connection with the embodiment is included in at least one embodiment of the invention. Thus, the appearances of the phrases "in one embodiment," "according to one embodiment" or the like appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In one embodiment, the modular boot firmware update service is provided within a secure partition that provides an isolated and controlled environment for receiving boot firmware code module updates from an enterprise platform management service. This secure partition ensures that updates to boot firmware code of the system are verified as originating with an authenticated source.

The isolated and secure environment of the boot firmware modular update service may comprise a variety of different types of partitions, including an entirely separate hardware partition (e.g., utilizing Intel® Corporation's Manageability Engine ("ME"), Active Management Technologies ("AMT"), Platform Resource Layer ("PRL") and/or other comparable or similar technologies) and/or a virtualized partition (e.g., a virtual machine in Intel® Corporation's Virtualization Technology ("VT") scheme). It will be apparent to those of ordinary skill in the art that a virtualized host may also be used to implement ME, AMT and PRL technologies (as described in further detail below with reference to FIG. 7.)

FIG. 1 is a block diagram of a system configured to enable modular boot firmware updates in accordance with one embodiment of the invention. Platform 100, which corresponds to a host computer system, includes a processor 110 connected to a chipset 120 via a desktop management interface (DMI) 111. Processor 110 provides processing power to platform 100 and may be a single-core or multi-core processor, and more than one processor may be included in platform 100. Processor 110 may be connected to other components of platform 100 via one or more system buses, communication pathways or mediums (not shown).

Chipset 120 includes a manageability engine (ME) 130, which may be implemented as an embedded microprocessor that operates independently of host processor 110, to manage the configuration and operation of platform 100. In one embodiment, processor 110 operates under the direction of a host operating system (not shown), whereas manageability engine (ME) 130 provides a secure and isolated environment that cannot be accessed by the host operating system. In one embodiment, manageability engine (ME) 130 authenticates users, controls access to peripheral devices, manages encryption keys for protection of data stored on storage devices of platform 100, and provides an interface to enterprise services 170 via network controller 160. Using enterprise services 170, manageability engine (ME) 130 maintains consistency with enterprise-wide policies for configuration and management of platforms such as platform 100, including providing a service for boot firmware modular updates in accordance with one embodiment of the invention. A boot firmware modular update manager may be implemented as firmware executed by manageability engine (ME 130).

Communication between ME 130 and enterprise services 170 occurs via out-of-band communication channel 171. In one embodiment, out-of-band communication channel 171 is a secure communication channel between the manageability engine (ME) 130 on the host system and enterprise services 170 that manages the host system. The encryption/decryption keys to enable secure communication between platform 100 and enterprise services 170 may be stored in the flash memory 190 of FIG. 1 during manufacture of chipset 120 and manageability engine (ME) 130.

In the embodiment shown in FIG. 1, manageability engine (ME) 130 is coupled to a microcontroller 140 via a Manageability Engine Controller Interface (MECI) 131. In one embodiment, microcontroller 140 is a general-purpose controller that performs storage command decoding and other accelerated operations. In the embodiment shown, manageability engine (ME) 130 controls the behavior of microcontroller 140, which in turn controls the behavior of storage controller 150. Microcontroller 140 includes drivers for storage controller 150 as well as the logic related to any disk encryption functionality. Storage controller 150 is the controller for storage devices such as storage device 152 and enables microcontroller 140 and ME 130 to access data stored on storage device 152.

Platform 100 further includes memory devices such as dynamic random access memory (DRAM) 112, static random access memory (SRAM) 122 within chipset 120, and flash memory 190, as well as storage device 152 accessible via storage controller 150. These memory devices may include random access memory (RAM) and read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. Storage device 152 may include mass storage devices such as integrated drive electronics (IDE) hard drives, and/or other devices or media, such as floppy disks, optical storage, tapes, flash memory, memory sticks, digital video disks, biological storage, etc.

Flash memory 190 is accessible by chipset 120 via flash interface 191. Data stored on storage device 152 and/or in memory devices DRAM 112, SRAM 122, and flash memory 190 may be encrypted.

Flash memory 190 contains firmware used to initialize platform 100. This initialization firmware includes Basic Input/Output System (BIOS) firmware 192 to identify and initialize system component hardware (such as the video display card and hard disk) and some other hardware devices including manageability engine (ME) 130. BIOS firmware 192 prepares system component hardware of platform 100 to operate in a known low capability state, so other software programs stored on various media, including an operating system, can be loaded, executed, and given control of platform 100. BIOS firmware 192 includes BIOS/ME communication module 193, which enables the initial configuration of manageability engine (ME) 130 during the boot process. In one embodiment, manageability engine (ME) 130 registers with BIOS/ME communication module 193 to receive a notification just before an operating system is loaded for platform 100. This notification enables manageability engine (ME) 130 to perform certain instructions in preparation for the operating system being loaded.

Flash memory 190 also includes network controller firmware 195 to configure network controller 160, and chipset firmware 196 to configure chipset 120. Flash memory 190 also contains a data region 198. In one embodiment, data region 198 is encrypted and may only be read by manageability engine (ME) 130. Information used by ME 130 to provide BIOS/boot firmware modular update management services may be stored in data region 198 of flash memory 190 or on storage device 152.

Traditionally, all firmware used to initialize a platform, start BIOS, and prepare the system for loading an operating system has been provided as a monolithic image that is loaded into non-volatile storage such as flash memory 190. For example, flash memory 190 would be prepared by the manufacturer to include a monolithic image of BIOS firmware 192 in its entirety. If an update to one code module only of BIOS firmware 192 was needed to correct a problem with boot firmware, the entire monolithic image of BIOS firmware 192 would need to be downloaded to flash memory 190.

Processor 110 may also be communicatively coupled to additional components, such as video controllers, small computer system interface (SCSI) controllers, network controllers, universal serial bus (USB) controllers, input devices such as a keyboard and mouse, etc. Platform 100 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as network controller 160 for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Platform 100 may be controlled, at least in part, by input from conventional input devices, such as keyboards, mice, etc., and/or by commands received from another machine, biometric feedback, or other input sources or signals. Platform 100 may utilize one or more connections to one or more remote data processing systems (not shown), such as through a network interface controller (NIC) 160, a modem, or other communication ports or couplings.

Platform 100 may be interconnected to other processing systems (not shown) by way of a physical and/or logical network, such as a local area network (LAN), a wide area network (WAN), an intranet, the Internet, etc. Communications involving a network may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Figure 2:
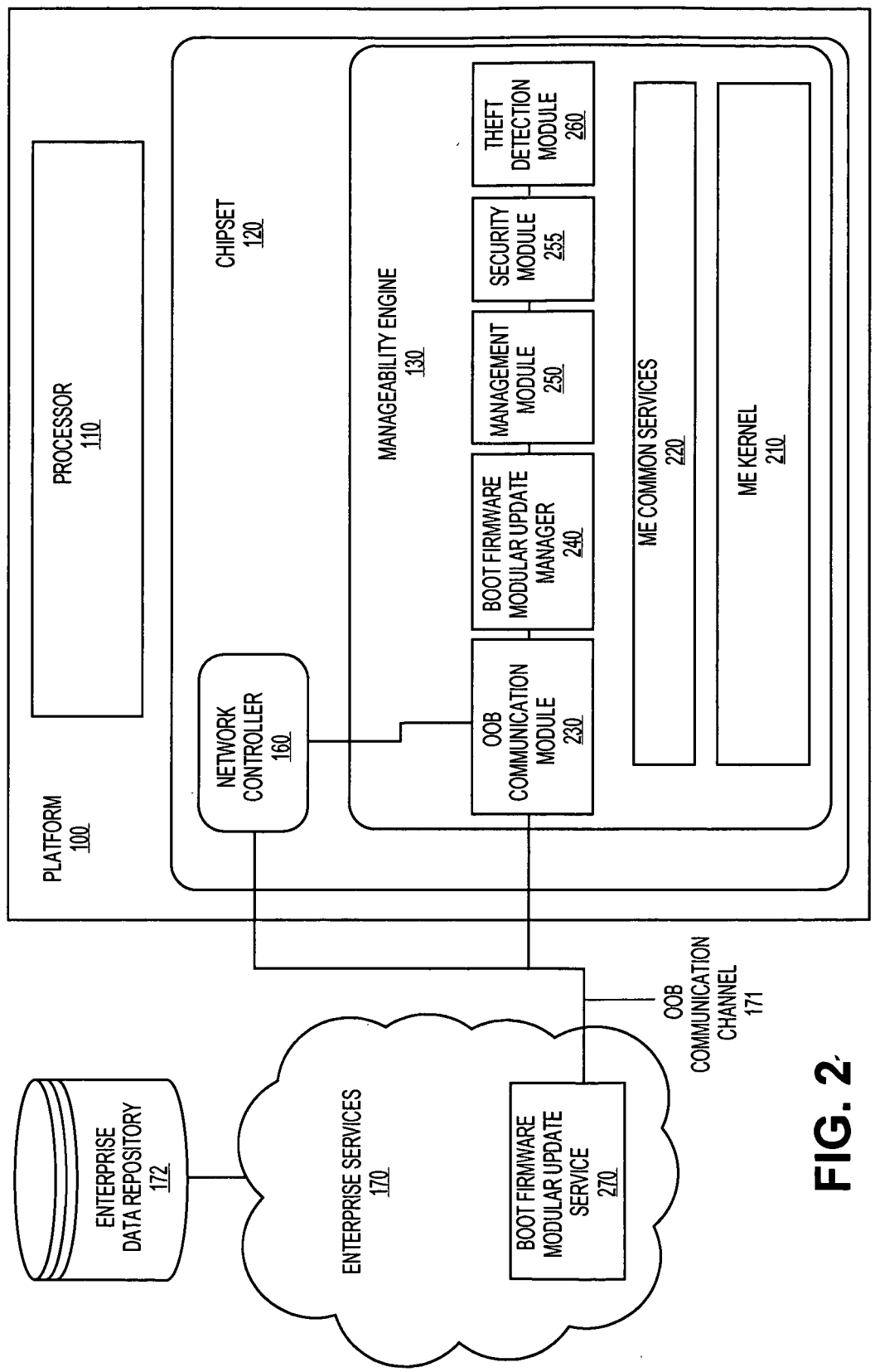
FIG. 2 shows further details of the system of FIG. 1 in enabling automated modular boot firmware updates in accordance with one embodiment of the invention.

FIG. 2 shows further details of manageability engine (ME) 130 and enterprise services 170 of FIG. 1 in enabling automated modular boot firmware updates in accordance with one embodiment of the invention. ME 130 includes logic for performing automated boot firmware modular updates on platform 100 and communicates with boot firmware modular update service 270 of enterprise services 170 via out-of-band communication channel 171.

Within chipset 120, manageability engine 130 is shown after chipset firmware 196 of FIG. 1 has been loaded. Manageability engine 130 includes ME kernel 210, which provides basic operational capabilities to manageability engine 130, and ME common services 220, which provides basic services such as network communication, security, cryptographic, and timer services. Manageability engine 130 also includes out-of-band (OOB) communication module 230. OOB communication module 230 facilitates communication between components of platform 100 with corresponding components of enterprise services 170 via network controller 160. Manageability engine 230 also includes boot firmware modular update manager 240, which manages the boot firmware modular update process and is described in further detail below.

Manageability engine (ME) 130 also includes management module 250, security module 255, and theft detection module 260. These modules are used in conjunction with enterprise services 170 to maintain consistency with enterprise-wide policies for configuration and management of platforms such as platform 100. OOB server communication module 230 facilitates communication between management module 250, security module 255, and theft detection module 260 with corresponding components (not shown) of enterprise services 170 via network controller 160.

boot firmware modular update manager 240 operates in conjunction with boot firmware modular update service 270 to enable automated modular boot firmware updates in accordance with one embodiment of the invention. OOB communication module 230 facilitates communication between modular boot firmware update manager 240 with boot firmware modular update service 270 via network controller 160. In one embodiment, out-of-band communication channel 171 is used to transfer updated boot firmware code modules to platform 100. In the embodiment shown, enterprise services 170 has an enterprise data repository 172 to store information such as versions of boot firmware code modules installed on the host system, encryption keys, and other data used by boot firmware modular update service 270. The operation of boot firmware modular update manager 240 and boot firmware modular update service 270 is described in further detail with reference to FIG. 3.

Figure 3:
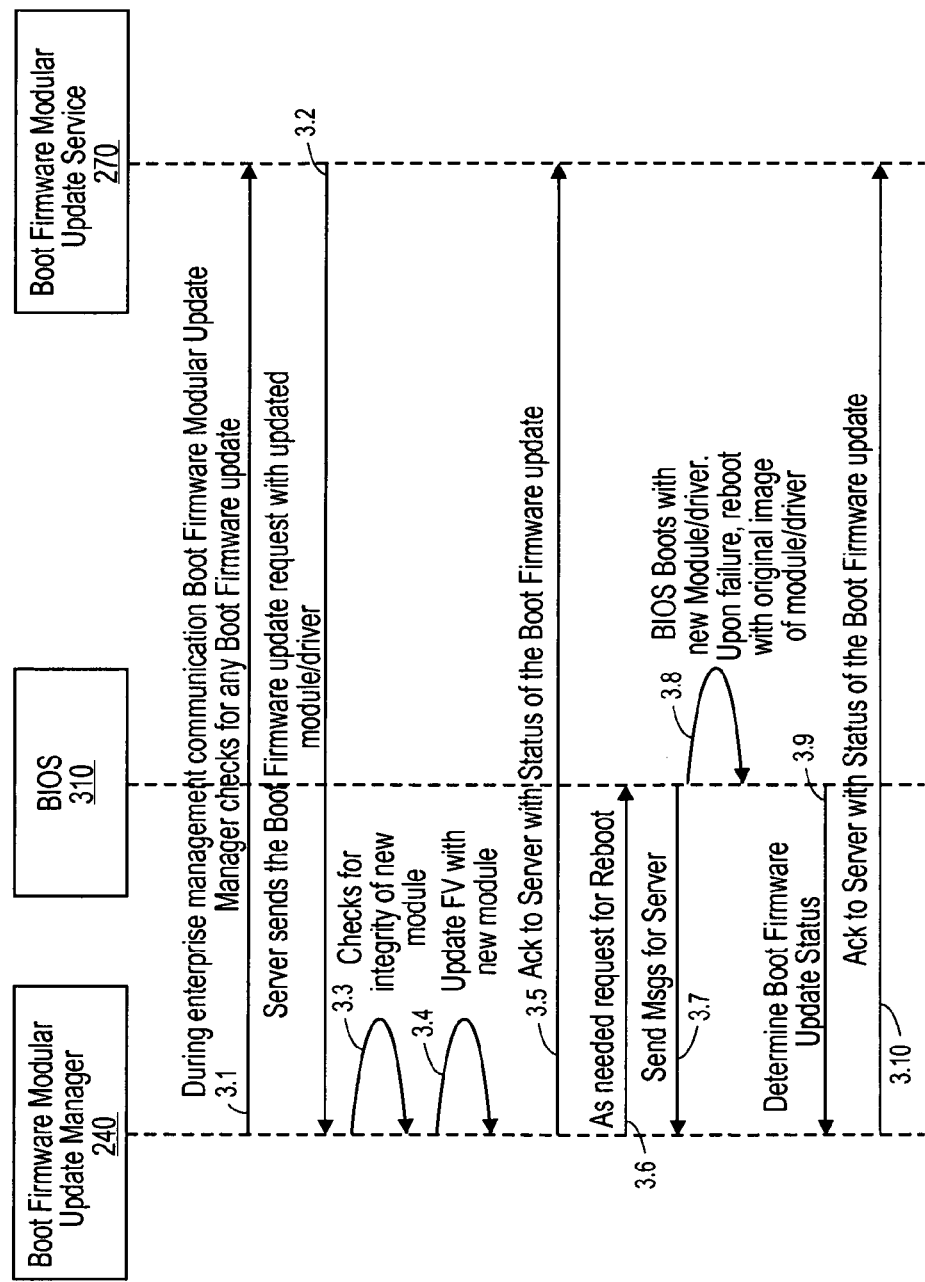
FIG. 3 is a flow diagram showing interaction between a boot firmware modular update manager and an enterprise boot firmware modular update service to perform an automated modular boot firmware update in accordance with one embodiment of the invention.

FIG. 3 is a flow diagram showing interaction between a boot firmware modular update manager and an enterprise boot firmware modular update service to perform an automated modular boot firmware update in accordance with one embodiment of the invention.

Enterprise services 170 of FIGS. 1 and 2 operate to maintain consistency with enterprise-wide policies for configuration and management of platforms such as platform 100. During communication between enterprise services 170 and platform 100 via OOB communication channel 171, boot firmware modular update manager 240 and boot firmware modular update service 270 may communicate regarding the boot firmware code modules on platform 100.

In action 3.1, boot firmware modular update manager 240 checks with boot firmware modular update service 270 for boot firmware updates. In action 3.2, if a boot firmware code module that pertains to platform 100 has been updated, boot firmware modular update service 270 sends a boot firmware update request along with an updated code module/driver to boot firmware modular update manager 240. While FIG. 3 shows communication beginning with boot firmware modular update manager 240, it is within the scope of the invention that communication between boot firmware modular update manager 240 and boot firmware modular update service 270 may be initiated on the server side by boot firmware modular update service 270.

In action 3.3, boot firmware modular update manager 240 checks the integrity of the updated code module/driver, including verifying that the update request is authentic and confirming the identity of the sender as boot firmware modular update service 270. In one embodiment, boot firmware modular update manager 240 verifies the integrity of the boot firmware update by calculating a signature from the updated code module/driver content and comparing the calculated signature to a signature provided by boot firmware modular update service 270 in an integrity-protected (encrypted) manifest that accompanies the updated module/driver. This comparison of a signature based upon the code module/driver content confirms that the updated module/driver has not been subject to tampering during transmission from boot firmware modular update service 270. The updated code module/driver is further protected by encryption, and boot firmware modular update manager 240 obtains decryption keys in order to decrypt the updated code module/driver. In one embodiment, the encryption/decryption keys are stored in the data region 198 of flash memory 190 of FIG. 1 during manufacture of chipset 120 and manageability engine (ME) 130 and are retrieved from flash memory 190 by boot firmware modular update manager 240.

If the integrity of the updated code module/driver was confirmed in action 3.3, boot firmware modular update manager 240 updates a firmware volume with the updated code module/driver in action 3.4. In one embodiment, updated code modules/drivers are placed into a separate dedicated partition of the firmware volume to facilitate the modular update, whereas the monolithic image of the original boot firmware code modules resides in a different partition of the firmware volume. boot firmware modular update manager 240 manages the partitioning of the firmware volume and only boot firmware modular update manager 240 has write access to the modular update partition of the firmware volume. The modular update partition of the firmware volume also stores an identifier for the updated code module/driver that enables the updated code module/driver to be used in place of the original code module/driver.

In action 3.5, boot firmware modular update manager 240 notifies boot firmware modular update service 270 of the status of the boot firmware update request. Once the updated code module/driver has been loaded into the modular update partition of the firmware volume, it will automatically be loaded when the system is booted. In action 3.6, boot firmware modular update manager 240 may request a reboot of the system to activate the updated code module/driver. A system boot sequence is described in further detail below with reference to FIG. 4. During the system boot sequence performed as a result of action 3.6, a boot firmware modular update dispatcher is invoked to ensure that the updated code module/driver replaces the original code module/driver. The actions performed by the boot firmware modular update dispatcher during the boot sequence are described further below with reference to FIGS. 5 and 6.

During the boot sequence, boot firmware modular update manager 240 may obtain information that can be communicated in messages to boot firmware modular update service 270, as shown in action 3.7. For example, a driver dispatcher (as described below with reference to FIGS. 4 and 6) may notify boot firmware modular update manager 240 when processing of the updated code module/driver begins. In action 3.8, after the various boot firmware code modules have been loaded into memory, BIOS 310 attempts to boot with the updated code module/driver. If BIOS 310 fails to boot, then another attempt to reboot BIOS 310 can be made with the original version of the code module/driver from the original boot firmware code module image stored in the partition of the firmware volume in which the original monolithic image resides.

In action 3.9, boot firmware update manager 240 receives information from the driver dispatcher regarding the status of the code module/driver update. For example, even though the updated boot firmware code module may have been loaded into memory, it may fail to execute properly. In action 3.10, boot firmware update manager 240 sends an acknowledgement message to boot firmware modular update service 270 with the status of the boot firmware update requested by boot firmware modular update service 270 in action 3.2.

During a system boot sequence, a series of hardware initialization phases occur beginning with power on until an operating system is loaded and assumes control of the system. The boot sequence is described herein in accordance with the Intel® Platform Innovation Framework for EFI (Extensible Firmware Interface) Architecture Specification (version 0.9, Sep. 16, 2003), available at the URL www-intel-com/technology/framework. The framework boot sequence will be described generally with reference to FIG. 4 to provide a context for the subsequent discussion of the invention. The invention is not limited to operating within the specific framework described.

Figure 4:
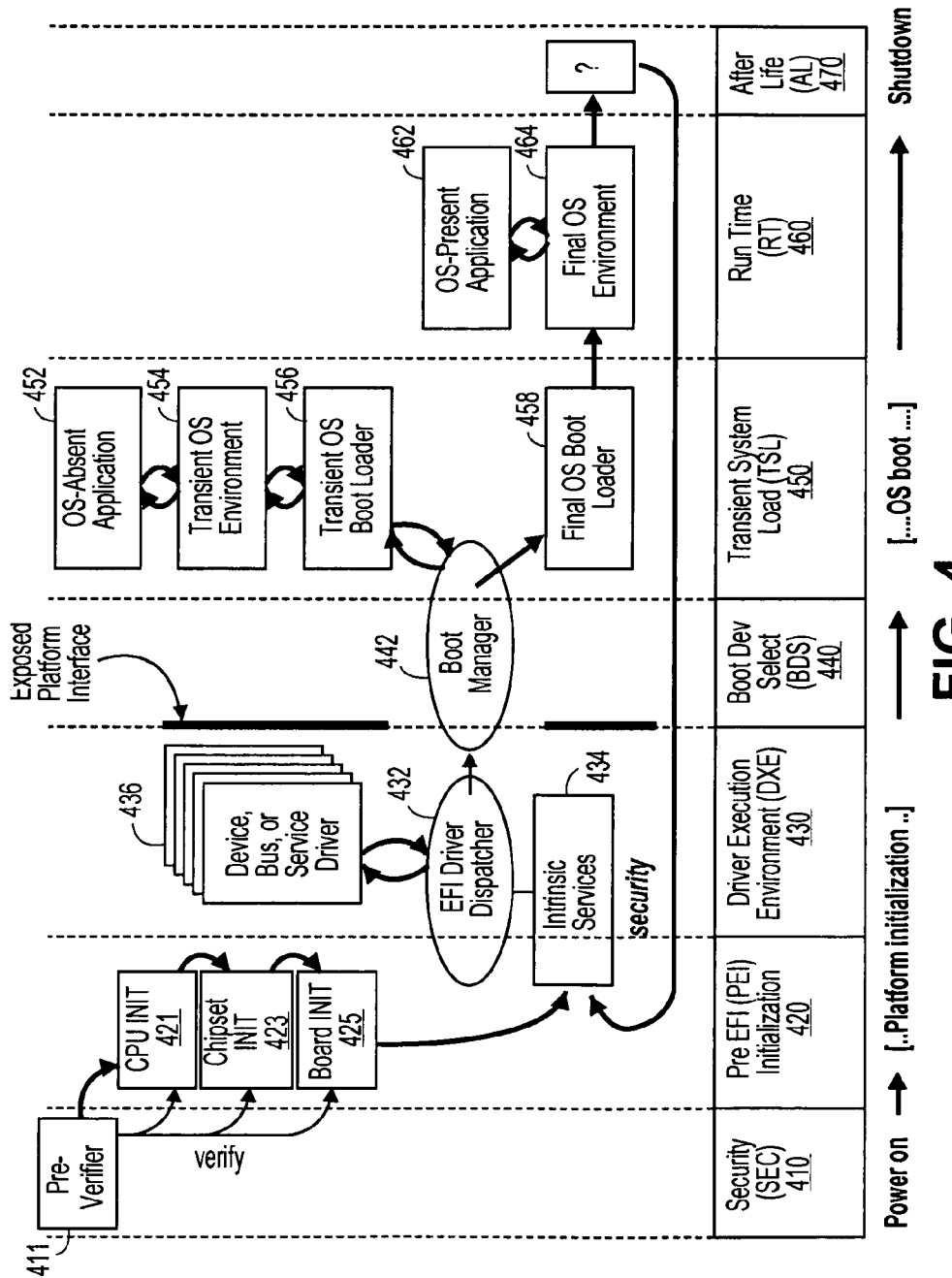
FIG. 4 shows phases of a boot sequence during which components of one embodiment of the invention operates.

Referring to FIG. 4, phases of a boot sequence during which components of one embodiment of the invention operates are shown. The framework boot sequence begins with a security phase 410 that executes when the system is powered on. A pre-verifier 411 executes during security phase 410 to authenticate the BIOS. In existing systems, pre-verifier 411 and the SEC phase 410 provide a Core Root of Trust for Measurement (CRTM), namely enough code to authenticate BIOS code and, if supported on the platform, start a Trusted Platform Module (TPM). More information about TPMs can be found at URL www-trustedcomputinggroup-org.

Upon completion of security phase 410, a pre-EFI initialization (PEI) phase 420 initializes the processor 421, chipset 423, and motherboard 425. PEI phase 420 initializes and describes a minimum amount of system RAM and firmware volume(s) that contain code for subsequent phases. During PEI phase 420, preparations are made to launch an EFI driver dispatcher 432 and intrinsic services 434 securely in the driver eXecution environment (DXE) phase 430. In DXE phase 430, EFI driver dispatcher 432 acts to load device, bus, and service drivers 436 in order to construct an environment that can support a boot manager to boot the operating system. With reference to the present invention, a modified version of the EFI driver dispatcher, referred to herein as a boot firmware modular update dispatcher, is used in DXE phase 430. Following DXE phase 430, a boot device selection (BDS) phase 440 loads a boot manager 442. Following BDS phase 440, a transient system load (TSL) phase 450 occurs during which the operating system is booted. Boot manager 442 launches a transient OS boot loader 456, which creates a transient OS environment 454 in which OS-absent applications 452 can run. Boot manager 442 also launches a final OS boot manager 458 which boots the operating system. During runtime phase 460, the system creates a final OS environment 464 in which OS-present applications 462 can run. During runtime phase 460, the system operates under control of the operating system. Upon a system failure during OS runtime (RT phase 460), the firmware PEI phase 420 and DXE phase 430 flows may be reconstituted in an after life phase 470 to allow OS-absent recovery activities.

Loading of updated boot firmware code modules/drivers in accordance with the present invention occurs during the driver eXecution environment (DXE) phase 430 under control of a boot firmware modular update dispatcher, which is a modified version of the EFI driver dispatcher 432 of FIG. 4 to facilitate modular boot firmware updates in accordance with embodiments of the present invention. The operation of a boot firmware modular update dispatcher is described in further detail with reference to FIGS. 5 and 6.

Figure 5:
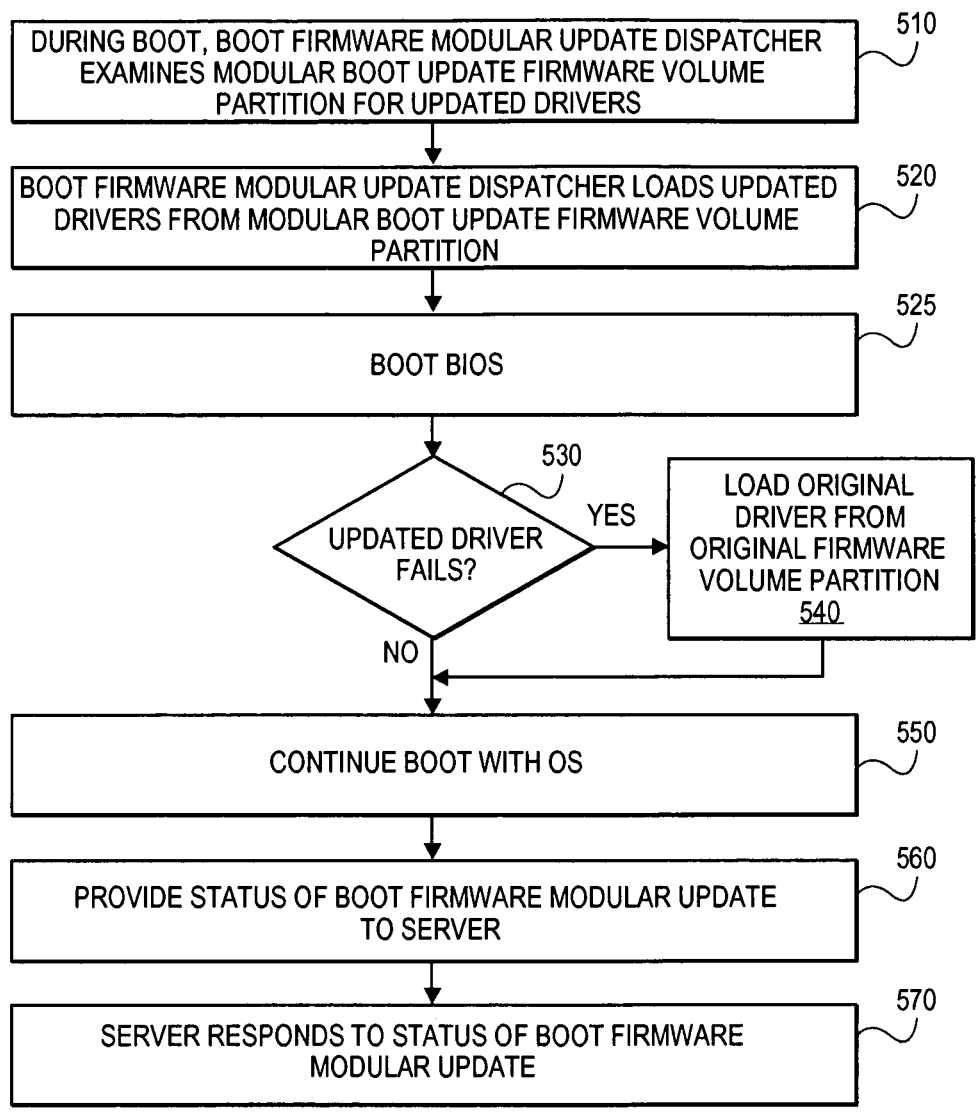
FIG. 5 is a flowchart of a method to perform a modular boot firmware update when booting a system in accordance with one embodiment of the invention.

FIG. 5 is a flowchart of a method to perform a modular boot firmware update when booting a system in accordance with one embodiment of the invention. In "During Boot, BIOS Modular Update Dispatcher Examines Modular BIOS Update Firmware Volume Partition for Updated Drivers" step 510, a boot firmware modular update dispatcher examines the modular update partition of the firmware volume for updated code modules/drivers. Control then proceeds to "Boot Firmware Modular Update Dispatcher Loads Updated Drivers from BIOS Modular Update Firmware Volume Partition" step 520, where the boot firmware modular update dispatcher loads the updated code modules/drivers into memory instead of the original code modules/drivers from the monolithic BIOS image stored in a different partition of the firmware volume. Control then proceeds to "Boot BIOS" step 530, where BIOS is booted at the end of the DXE phase 430 of FIG. 4. Control then proceeds to "Updated Driver Fails?" decision point 430, where a determination is made whether the updated driver failed during the BIOS boot. If the updated driver failed, control proceeds to "Load Original Driver from Original Firmware Volume Partition" step 540, where the original code module/driver is loaded from the monolithic BIOS image stored in the original partition of the firmware volume. Control then proceeds to "Continue Boot with OS" step 550, where the boot sequence continues with booting the operating system. While the boot sequence continues, control proceeds to "Provide Status of Boot Firmware Modular Update to Server" step 560, where, as described with reference to FIG. 3, BIOS modular update manager 240 provides status updates to boot firmware modular update service 270. Control then proceeds to "Server Responds to Status of Boot Firmware Modular Update" step 570, where boot firmware modular update service 270 may respond to the status messages received regarding the modular boot firmware update. For example, if the modular boot firmware update failed, boot firmware modular update service 270 may provide another version of the updated code module/driver in a subsequent update request.

Figure 6:
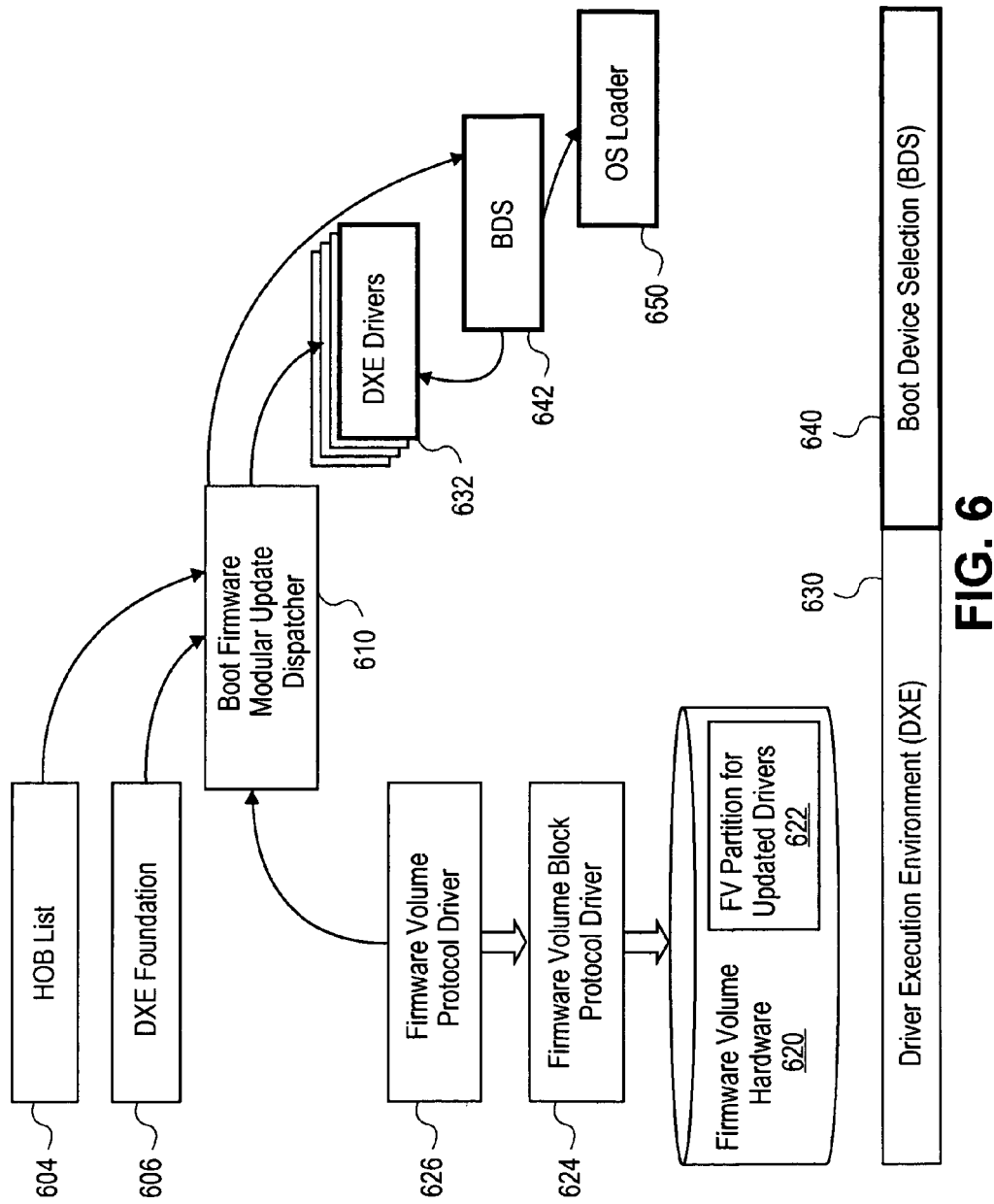
FIG. 6 is a flow diagram for booting a system after an automated modular boot firmware update has been performed in accordance with one embodiment of the invention.

FIG. 6 is a flow diagram for booting a system after an automated modular boot firmware update has been performed in accordance with one embodiment of the invention. The flow diagram of FIG. 6 shows activities occurring during DXE phase 630 and BDS phase 640, which correspond to DXE phase 430 and BDS phase 440 of FIG. 4. Prior to the execution of DXE phase 630, a security phase similar to SEC phase 410 and a PEI phase similar to PEI phase 420 of FIG. 4 have been performed. The previous PEI phase will have initialized a hand-off block list 604, which is a data structure containing information being passed from the previous phase in the boot sequence during which initialization of the processor, chipset, and main memory occurred. Hand-off block list 604 will contain information about firmware volume(s) discovered during initialization of the system, including the firmware volumes found in firmware volume hardware 620. For example, during the PEI phase while booting the system shown in FIG. 1, a firmware volume would be discovered containing partitions for BIOS firmware 192 and chipset firmware 196. Each separate firmware volume discovered may have its own respective hand-off block provided by the PEI phase. Hand-off block list 604 details the location of firmware volumes that contain firmware files and includes a base address and length for each firmware volume. A DXE Initial Program Load (IPL) initialization module may use hand-off block list 604 to discover the location of the DXE Foundation firmware file.

The previous PEI phase will also discover and launch DXE foundation code 606. DXE foundation code 606 produces a set of boot services, runtime services, and DXE services. DXE foundation code 606 uses hand-off block list 604 to discover drivers to execute. DXE foundation code 606 is designed to be completely portable with no processor, chipset or platform dependencies. DXE foundation code 606 depends only upon hand-off block list 604 for its initial state. This single dependency means that DXE foundation code 606 does not depend on any services from a previous phase, so all the prior phases can be unloaded once hand-off block list 604 is passed to DXE foundation code 606. DXE foundation code 606 contains no hard coded addresses. As a result, DXE foundation code 606 can be loaded anywhere in physical memory and can function correctly no matter where physical memory or where firmware volumes are located in the processor's physical address space. DXE foundation code 606 does not contain any processor-specific, chipset-specific, or platform-specific information. Instead, DXE foundation code 606 is abstracted from the system hardware through a set of architectural protocol interfaces. These architectural protocol interfaces are produced by a set of DXE drivers that are invoked by the DXE Dispatcher, here represented as boot firmware modular update dispatcher 610.

DXE foundation code 606 produces the EFI System Table and its associated set of EFI Boot Services and EFI Runtime Services. DXE foundation code 606 also contains boot firmware modular update dispatcher 610. After DXE foundation code 606 is launched, control is passed to a DXE dispatcher, which in this case is boot firmware modular update dispatcher 610, which is responsible for loading and invoking DXE drivers found in the firmware volumes described in the hand-off blocks such as hand-off block list 604.

Firmware volume hardware 620 is a persistent physical repository that contains firmware code and/or data. Firmware volume hardware is typically a flash component such as flash memory 190 of FIG. 1 but may be some other type of persistent storage. A single physical firmware device may be divided into smaller pieces to form multiple logical firmware devices. Similarly, multiple physical firmware devices may be aggregated into one larger logical firmware device. A logical firmware device is called a firmware volume. In the EFI framework, the basic storage repository for data and/or code is the firmware volume. Each firmware volume is organized into a file system. As such, the file is the base unit of storage for EFI framework firmware.

If the files contained in a firmware volume are accessed from either the Security (SEC) or Pre-EFI Initialization (PEI)

phases or early in the Driver Execution Environment (DXE) phase, the firmware volume may be memory mapped and follow the Framework Firmware File System (FFS) format, which is defined in the Intel® Platform Innovation Framework for EFI Firmware File System Specification, available at the URL www-intel-com/technology/framework. The SEC, PEI, and DXE phases can then parse the FFS and Framework firmware image format as necessary.

Boot firmware modular update dispatcher 610 searches for drivers in the firmware volumes described in hand-off block list 604. A firmware volume may have an associated file, referred to as an a priori file, which contains the list of DXE drivers that should be loaded and executed first. Once the DXE drivers from the a priori file have been loaded and executed, dependency expressions in the remaining DXE drivers in the firmware volumes may be evaluated to determine the order in which they will be loaded and executed.

In one embodiment, control is transferred from boot firmware modular update dispatcher 610 to BDS 642 after the DXE drivers in the a priori file and all the DXE drivers whose dependency expressions evaluate to TRUE have been loaded and executed. BDS 642 is responsible for establishing the console devices and attempting the boot of operating systems in BDS phase 640. As the console devices are established and access to boot devices is established, additional firmware volumes may be discovered. If BDS 642 is unable to start a console device or gain access to a boot device, it reinvokes boot firmware modular update dispatcher 610. This invocation allows boot firmware modular update dispatcher 610 to load and execute DXE drivers 632 from firmware volumes that have been discovered since the last time the boot firmware modular update dispatcher 610 was invoked. Once the boot firmware modular update dispatcher has loaded and executed all the DXE drivers 632 it can, control is once again returned to BDS 642 to continue the OS boot process.

The EFI Firmware Volume Protocol allows programs running during the DXE phase to access firmware volumes, including firmware volumes that are not memory mapped and firmware volumes that do not implement the FFS. In the embodiment shown, BIOS/modular update dispatcher 610 accesses firmware volumes using the file abstraction contained in the EFI Firmware Volume Protocol using a firmware volume protocol driver 626.

In the embodiment shown, the Firmware Volume Protocol is produced by firmware volume protocol driver 626, which serves as a file system driver, and uses the EFI Firmware Volume Block Protocol as implemented by firmware volume block protocol driver 624 to access the firmware volume hardware 620. Firmware volume block protocol driver 624 provides block-level access to firmware volume hardware 620. Although the drivers 624 and 626 shown as implementing the EFI Firmware Volume Block Protocol provide an abstraction of firmware volume hardware 620, an arbitrary number of abstractions beneath the Firmware Volume Block driver may be used to satisfy platform requirements. The EFI Firmware Volume Block Protocol provides byte-level read/write functionality and block-level erase functionality. The EFI Firmware Volume Block Protocol further exposes device-hardening features, such as may be required to protect the firmware from unwanted overwriting and/or erasure. A file system driver such as firmware volume protocol driver 626 may be layered on top of the firmware volume block protocol driver to enable file-level access to a firmware volume. The Firmware Volume Protocol abstracts the file system that is used to format the firmware volume and the hardware device-hardening features that may be present. For more information, including information on the Firmware Volume Protocol, see the Intel® Platform Innovation Framework for EFI Firmware Volume Specification available at the URL www-intel-com/technology/framework.

Boot firmware modular update dispatcher 610 operates during pre-boot to schedule drivers for execution. In one embodiment, boot firmware modular update dispatcher 610 provides dispatch services to load and execute DXE drivers from the firmware volume; scheduling services to clear the schedule on require (SOR) flag for a component that is stored in a firmware volume; trust services to change the state of a file stored in a firmware volume from an untrusted state to a trusted state; and ProcessFirmwareVolume services to create a firmware volume handle for a firmware volume that is presented in system memory. In one embodiment, boot firmware modular update dispatcher looks into all firmware volumes available and creates a list of drivers/code modules that will be loaded based on the version information. As described above, boot firmware modular update dispatcher 610 first looks into FV partition for updated drivers 622 for updated drivers and then into a separate partition of the firmware volume for the original drivers. Boot firmware code modules to be updated will have a version string that defines the latest EFI driver/module which needs to load during pre-boot.

The boot firmware modular update mechanism described herein enables individual boot firmware code modules to be updated rather than requiring download and update of an entire boot firmware monolithic image. The techniques described herein provide security with an integrity check of updated modules/drivers, and provide a more user-friendly update process since the user is not required to reboot his or her system to receive a modular boot firmware update.

The techniques described herein are also fault-tolerant so that if the new updated code module/driver fails, then the original code driver/module will be used to boot the system, which will continue to function as it did prior to the attempted update. Feedback can be provided to the server about the failed module so that a corrected code module/driver can be provided in a subsequent update request.

Figure 7:
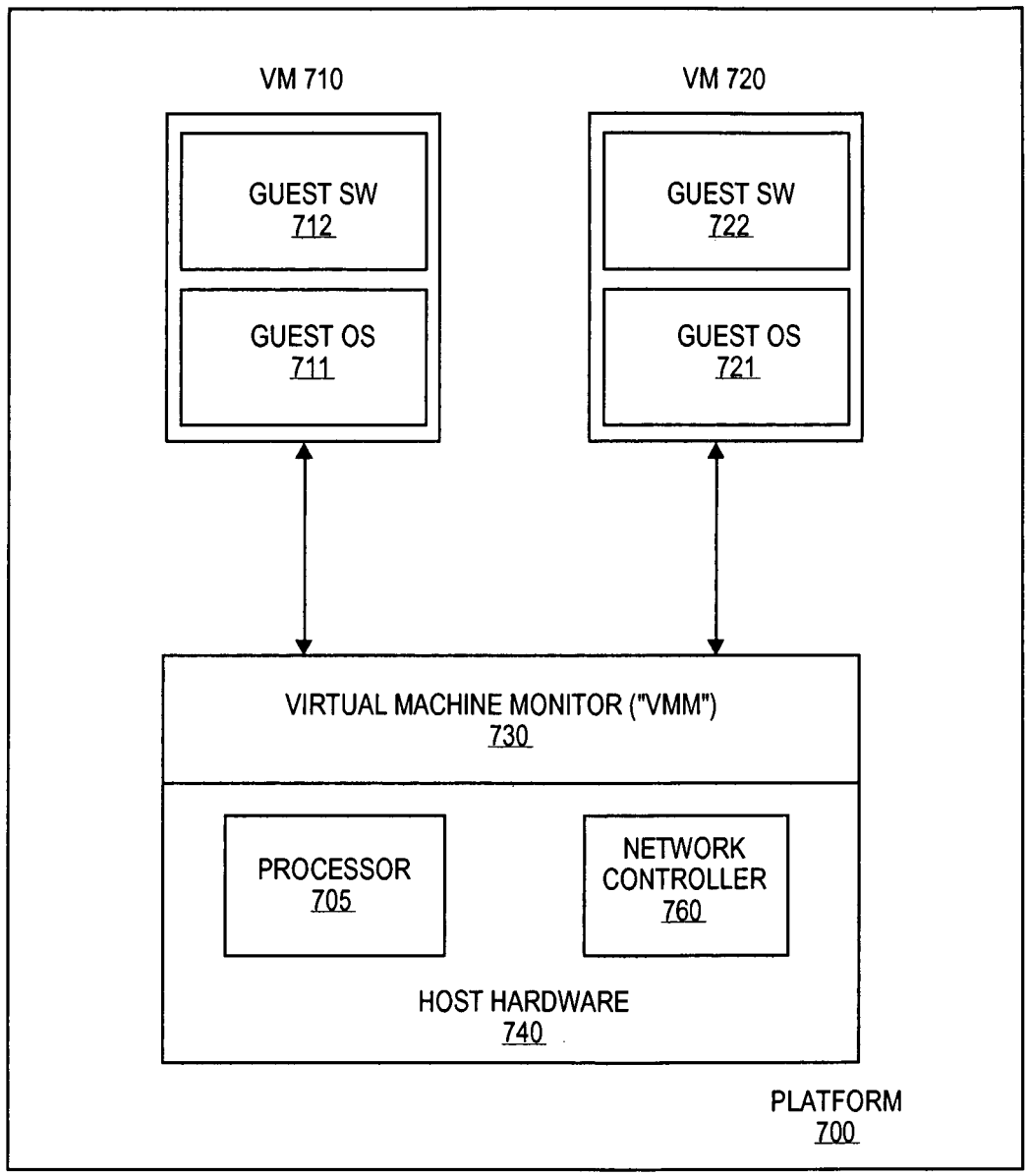
FIG. 7 shows a virtual machine environment for implementing a boot firmware modular update manager in accordance with one embodiment of the invention.

FIG. 7 shows a virtual machine environment for implementing a boot firmware modular update manager in accordance with one embodiment of the invention. If platform 700 is virtualized, it may include only a single processor but a virtual machine monitor ("VMM 730") on the host may present multiple abstractions and/or views of the host, such that the underlying hardware of the host appears as one or more independently operating virtual machines ("VMs"). VMM 730 may be implemented in software (e.g., as a standalone program and/or a component of a host operating system), hardware, firmware and/or any combination thereof VMM 730 manages allocation of resources on the host and performs context switching as necessary to cycle between various VMs according to a round-robin or other predetermined scheme. It will be readily apparent to those of ordinary skill in the art that although only one processor is illustrated ("Processor 705"), embodiments of the present invention are not so limited and multiple processors may also be utilized within a virtualized environment.

Although only two VM partitions are illustrated ("VM 710" and "VM 720", hereafter referred to collectively as "VMs"), these VMs are merely illustrative and additional virtual machines may be added to the host. VM 710 and VM 720 may function as self-contained platforms respectively, running their own "guest operating systems" (i.e., operating systems hosted by VMM 730, illustrated as "Guest OS 711" and "Guest OS 721" and hereafter referred to collectively as "Guest OS") and other software (illustrated as "Guest Software 712" and "Guest Software 722" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on platform 700. Within each VM, the Guest OS and/or Guest Software may behave as if they were, in effect, running on platform 700's physical hardware ("Host Hardware 740", which may include a network controller 760).

It will be readily apparent to those of ordinary skill in the art that a physical hardware partition with a dedicated processor such as manageability engine (ME) 130 of FIG. 1 may provide a higher level of security than a virtualized partition (as illustrated in FIG. 7), but embodiments of the invention may be practiced in either environment and/or a combination of these environments to provide varying levels of security. It will also be readily apparent to those of ordinary skill in the art that an ME, AMT or PRL platform may be implemented within a virtualized environment. For example, VM 720 may be dedicated as an ME partition on a host while VM 710 runs typical applications on the host. In this scenario, the host may or may not include multiple processors. If the host does include two processors, for example, VM 720 may be assigned the other processor while VM 710 (and other VMs on the host) may share the resources of processor 705. On the other hand, if the host includes only a single processor, the processor may serve both the VMs, but VM 720 may still be isolated from the other VMs on the host with the cooperation of VMM 730. For the purposes of simplicity, embodiments of the invention are described in a manageability engine (ME) environment, but embodiments of the invention are not so limited. Instead, any reference to manageability engine, ME, a "partition", "a secure partition", a "security partition" and/or a "management partition" shall include any physical and/or virtual partition (as described above).

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for performing automated boot firmware modular updates. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A computer-implemented method comprising:
receiving an updated boot firmware code module in a secure partition implemented in a microprocessor of a system, the secure partition receiving the updated boot firmware code module from a server via an out-of-band communication channel between the secure partition and the server, the secure partition being isolated from a host operating system of the system, the updated boot firmware code module to replace one original boot firmware code module of a plurality of boot firmware code modules stored in a different partition of the system;
automatically replacing the one original boot firmware code module with the updated boot firmware code module; and
automatically executing the updated boot firmware code module with the plurality of boot firmware code modules for the system when the system is next booted,
wherein if a problem occurs during loading of the updated boot firmware module, the method includes causing the one original boot firmware code module to be loaded.

2. The method of claim 1, further comprising:
writing the updated boot firmware code module to an update partition of a firmware volume, wherein the update partition of the firmware volume is read along with the different partition of the firmware volume containing the plurality of boot firmware code modules when the system is booted.

3. The method of claim 2, further comprising:
authenticating integrity of the updated boot firmware module prior to writing the updated boot firmware module to the update partition of the firmware volume.

4. The method of claim 1, further comprising:
authenticating integrity of the server prior to receiving the updated boot firmware module.

5. The method of claim 1, further comprising:
providing a status of installation of the updated boot firmware code module after the system is booted to a server from which the updated boot firmware code module was received.

6. A system comprising:
   at least one processor executing a host operating system and a plurality of boot firmware code modules for the system; and
   a secure partition coupled to the processor, the secure partition isolated from the host operating system, the secure partition for receiving an updated boot firmware code module from a server via an out-of-band communication channel between the secure partition and the server, the updated boot firmware code module to replace one original boot firmware code module of the plurality of boot firmware code modules for the system, the secure partition further for automatically replacing the one original boot firmware code module with the updated boot firmware code module, the processor for automatically executing the updated boot firmware code module with the plurality of boot firmware code modules for the system when the system is next booted, wherein if a problem occurs during loading of the updated boot firmware module, the processor causes the one original boot firmware code module to be loaded, and wherein the plurality of boot firmware code modules are stored in a different partition of the system.

7. The system of claim 6, wherein the secure partition is further for
   writing the updated boot firmware code module to an update partition of a firmware volume, wherein the update partition of the firmware volume is read along with the different another partition of the firmware volume containing the plurality of boot firmware code modules when the system is booted.

8. The system of claim 7, wherein the secure partition is further for
   authenticating integrity of the updated boot firmware module prior to writing the updated boot firmware module to the update partition of the firmware volume.

9. The system of claim 6, wherein the secure partition is further for authenticating integrity of the server prior to receiving the updated boot firmware module.

10. The system of claim 7, wherein the secure partition is further for
    providing a status of installation of the updated boot firmware code module after the system is booted to a server from which the updated boot firmware code module was received.

11. A computer program product comprising:
    a non-transitory computer-readable storage medium; and
    instructions in the computer-readable storage medium, wherein the instructions, when executed in a processing system, cause the processing system to perform operations comprising:
    receiving an updated boot firmware code module in a secure partition of the processing system, the secure partition receiving the updated boot firmware code module from a server via an out-of-band communication channel between the secure partition and the server, the secure partition being isolated from a host operating system of the system, the updated boot firmware code module to replace one original boot firmware code module of a plurality of boot firmware code modules stored in a different partition of for the processing system;
    automatically replacing the one original boot firmware code module with the updated boot firmware code module; and
    automatically executing the updated boot firmware code module with the plurality of boot firmware code modules for the processing system and without user intervention when the processing system is next booted,
    wherein if a problem occurs during loading of the updated boot firmware module, the operations include causing the one original boot firmware code module to be loaded.

12. The computer program product of claim 11, wherein the instructions further cause the processing system to perform operations comprising:
    writing the updated boot firmware code module to an update partition of a firmware volume, wherein the update partition of the firmware volume is read along with the different another partition of the firmware volume containing the plurality of boot firmware code modules when the processing system is booted.

13. The computer program product of claim 12, wherein the instructions further cause the processing system to perform operations comprising:
    authenticating integrity of the updated boot firmware module prior to writing the updated boot firmware module to the update partition of the firmware volume.

14. The computer program product of claim 11, wherein the instructions further cause the processing system to perform operations comprising:
    authenticating integrity of the server prior to receiving the updated boot firmware module.

15. The computer program product of claim 11, wherein the instructions further cause the processing system to perform operations comprising:
    providing a status of installation of the updated boot firmware code module after the system is booted to a server from which the updated boot firmware code module was received.

* * * * *